US011534708B2

(12) United States Patent
Bhimaraja et al.

(10) Patent No.: US 11,534,708 B2
(45) Date of Patent: Dec. 27, 2022

(54) FILTER AIDS (71) Applicant: IMERYS USA, INC., Roswell, GA (US)

(72) Inventors: Udaya Bhimaraja, Pleasanton, CA (US); David Gittins, San Jose, CA (US); David Stewart, Alpharetta, GA (US)

(73) Assignee: IMERYS USA, INC., Roswell, GA (US)

(*) Notice: Subject to any disclaimer, the term of this patent is extended or adjusted under 35 U.S.C. 154(b) by 141 days.

(21) Appl. No.: 16/648,347

(22) PCT Filed: Sep. 14, 2018

(86) PCT No.: PCT/US2018/051055
§ 371 (c)(1),
(2) Date: Mar. 18, 2020

(87) PCT Pub. No.: WO2019/060217
PCT Pub. Date: Mar. 28, 2019

(65) Prior Publication Data
US 2020/0222837 A1 Jul. 16, 2020

Related U.S. Application Data (60) Provisional application No. 62/699,917, filed on Jul. 18, 2018, provisional application No. 62/561,498, filed on Sep. 21, 2017.

(51) Int. Cl.
*B01D 37/02* (2006.01)
*B01J 20/10* (2006.01)
*B01J 20/14* (2006.01)
*B01J 20/26* (2006.01)
*B01J 20/28* (2006.01)
*B65D 65/46* (2006.01)
*C02F 1/28* (2006.01)
*C02F 103/42* (2006.01)

(52) U.S. Cl.
CPC ........... *B01D 37/02* (2013.01); *B01J 20/106* (2013.01); *B01J 20/14* (2013.01); *B01J 20/261* (2013.01);
(Continued)

(58) Field of Classification Search
CPC ......... B01D 37/02; B01J 20/106; B01J 20/14; B01J 20/261; B01J 20/2805;
(Continued)

(56) References Cited

U.S. PATENT DOCUMENTS 3,327,859 A   6/1967 Pall et al.
4,289,815 A * 9/1981 Lee ........................ C02F 1/50
                                                206/0.84
(Continued)

FOREIGN PATENT DOCUMENTS

EP    0366231 A1 *  5/1990  ............... C02F 1/28

OTHER PUBLICATIONS

Blackman, S., Vanishing packaging: the trend for dissolvable materials. [Online] Feb. 12, 2013 [retrieved on Nov. 12, 2018], Retrieved from the Internet <URL: https://packaging-gateway.com/features/featurevanishing-packaging-trend-dissolvable-materials/>; third and fourth pages.
(Continued)

*Primary Examiner* — Jason M Greene
(74) *Attorney, Agent, or Firm* — Finnegan, Henderson, Farabow, Garrett & Dunner LLP (57) ABSTRACT The present disclosure includes compositions and methods for filtering a liquid, e.g., water. The compositions herein may include a filter aid comprising a filter medium and packaging having at least one water-soluble portion. When the filter aid is introduced into the liquid to be filtered, the water-soluble portion(s) may dissolve or otherwise degrade in order to expose the filter medium to the liquid.

20 Claims, 6 Drawing Sheets

(52) U.S. Cl.
CPC .......... *B01J 20/2805* (2013.01); *B65D 65/46* (2013.01); *C02F 1/281* (2013.01); *C02F 1/283* (2013.01); *C02F 1/286* (2013.01); *C02F 2103/42* (2013.01)

(58) Field of Classification Search
CPC .... B01J 20/28052; B65D 65/46; C02F 1/281; C02F 1/283; C02F 1/286; C02F 2103/42; C02F 1/68
USPC ............... 206/524.7; 424/408; 252/175–176; 210/193
See application file for complete search history.

(56) References Cited

U.S. PATENT DOCUMENTS

| | | | | |
|---|---|---|---|---|
| 4,935,126 | A * | 6/1990 | Drori | ................... B01D 29/885 210/107 |
| 2002/0182348 | A1 * | 12/2002 | Fujiwara | ................... C08F 8/12 428/35.2 |
| 2006/0188535 | A1 * | 8/2006 | Sjogren | ................... A01N 49/00 424/405 |
| 2011/0006009 | A1 | 1/2011 | Hamlin et al. | |
| 2011/0054425 | A1 * | 3/2011 | Smith | ................... A61F 5/448 156/252 |
| 2011/0127224 | A1 | 6/2011 | Gaudin | |
| 2014/0124454 | A1 * | 5/2014 | Nichols | ................... C02F 1/56 210/732 |
| 2015/0360837 | A1 | 12/2015 | Perez-Prat Vinuesa et al. | |

OTHER PUBLICATIONS

Aqua-Cel, DE Pool Filter Media in 1 lbs. Water soluble Bags The safest way to add DE to your De filter! [Online] Jul. 23, 2018 [retrieved on Nov. 12, 2018], Retrieved from the Internet <URL: https://www.swimmingpoollearning.com/aqua-cel>.

International Search Report for International Application PCT/US2018/051055, dated Dec. 31, 2018.

* cited by examiner

FILTER AIDS

CLAIM FOR PRIORITY

This application is a U.S. national phase entry of International Application No. PCT/US2018/051055, filed Sep. 14, 2018, which claims the benefit of priority from U.S. Provisional Application No. 62/561,498, filed on Sep. 21, 2017 and from U.S. Provisional Application No. 62/699,917, filed on Jul. 18, 2018, to all of which this application claims the benefit of priority, and the entirety of the subject matter of both of which is incorporated herein by reference.

TECHNICAL FIELD

Embodiments of the present disclosure relate generally to filter aids and methods of use thereof.

BACKGROUND

In the field of fluid (e.g., water) filtration, minerals such as diatomaceous earth and perlite may be employed to filter various solids and/or other materials from the fluid. When used for filtration, such materials are typically in the form of fine particles or powder, which can result in significant dust generation when added to the fluid. The fine particles can pose serious health risks when inhaled. Further, a considerable amount of the filtration material can be deposited in locations other than the fluid, leading to waste. These adverse effects can be compounded when multiple applications of the filtration materials are needed to maintain a desired quality of the fluid.

SUMMARY OF THE DISCLOSURE

The present disclosure includes filter aids and methods for filtering liquids such as water. For example, the present disclosure includes a method for filtering water comprising introducing a filter aid into a flow of water to filter the water, wherein the filter aid comprises a filter medium and packaging enclosing the filter medium, the packaging comprising at least one water-soluble portion. In some cases, introducing the filter aid into the flow of water may include introducing the filter aid into an inlet of a filtration device. For example, the inlet may be a pool skimmer. In at least one example, the flow of water may be in communication with a swimming pool, a spa, a hot tub, or a fountain.

According to some aspects of the present disclosure, at least 80% of the filter medium may be in contact with the water within 1 minute after introducing the filter aid into the flow of water. The filter medium may comprise diatomaceous earth, perlite, sand, cellulose, bentonite, silica gel, activated carbon, or a mixture thereof. In some examples, the filter aid may comprise from about 5 kg to about 25 kg of the filter medium.

According to some aspects of the present disclosure, an entirety of the packaging may be water-soluble and have a thickness ranging from about 20 μm to about 150 μm. In some examples, the at least one water-soluble portion may dissolve within 30 seconds or 1 minute after introducing the filter aid into the flow of water. The at least one water-soluble portion may comprise a first water-soluble portion and a second water-soluble portion, and the first water-soluble portion may dissolve faster than the second water-soluble portion. In at least one example, the at least one water-soluble portion of the packaging may comprise polyvinyl alcohol. In some examples, the packaging may comprise at least one water-insoluble portion.

The present disclosure also includes a method for filtering water comprising introducing a filter aid into an inlet of a filtration device, such that the filter aid contacts a flow of water to filter the water, wherein the filter aid comprises diatomaceous earth, perlite, sand, or a combination thereof enclosed by packaging; and wherein at least a portion of the packaging may comprise polyvinyl alcohol.

Also disclosed herein are filter aids. For example, the filter aid may comprise a filter medium and packaging enclosing the filter medium, wherein the packaging comprises at least one water-soluble portion and at least one water-insoluble portion. In some cases, the filter aid may comprise from about 0.1 kg to about 25 kg or from about 5 kg to about 25 kg of the filter medium. The filter medium may comprise, for example, diatomaceous earth, perlite, sand, cellulose, bentonite, silica gel, activated carbon, or a mixture thereof.

According to some aspects of the present disclosure, the at least one water-soluble portion of the filter aid may have a thickness ranging from about 20 μm to about 150 μm. In some cases, the at least one water-soluble portion may form a seam of the packaging. The at least one water-soluble portion may include a first water-soluble portion and a second water-soluble portion, and the first water-soluble portion may dissolve in water faster than the second water-soluble portion. In at least one example, the at least one water-soluble portion may comprise polyvinyl alcohol.

According to some aspects of the present disclosure, the packaging of the filter aid may be heat sealed. In some cases, the packaging may comprise a first compartment enclosing the filter medium and a second compartment enclosing a material different from the filter medium. The first compartment may dissolve in water slower than the second compartment. In some examples, the material enclosed in the second compartment may comprise cellulose or a cellulose derivative.

According to some aspects of the present disclosure, a method for delivering a mechanical insecticide is provided. The method may for example include introducing a mechanical insecticide into water for form a slurry or suspension, wherein the mechanical insecticide comprises a powdered or granular mechanical insecticide and is packaged in packaging comprising at least one water-soluble portion. In one embodiment, the mechanical insecticide can comprise perlite. In another embodiment, the mechanical insecticide comprises diatomaceous earth. In yet another embodiment, the mechanical insecticide comprises diatomaceous earth carrying one or more of a surfactant, a chemical insecticide, or a herbicide.

According to some additional aspects of the present disclosure, a method for delivering a mineral composition is provided. The method may for example include introducing a mineral composition into water for form a slurry or suspension, wherein the mineral comprises a powdered or granular mineral and is packaged in packaging comprising at least one water-soluble portion. In one embodiment, the mineral can comprise perlite. In another embodiment, the mineral comprises diatomaceous earth. In yet another embodiment, the mineral comprises diatomaceous earth carrying one or more of a surfactant, a chemical insecticide, or a herbicide. In one aspect, the slurry or suspension of the mineral composition can be applied to a crop as a sun protectant or mechanical insecticide. In another aspect, the slurry or suspension of the mineral composition can be applied to soil as a soil conditioner.

BRIEF DESCRIPTION OF DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

The present disclosure includes filter aids (e.g., compositions, devices, and systems useful for filtration) and methods of use thereof. For example, the filter aids may comprise a filter medium and a packaging comprising at least one water-soluble portion. The water-soluble portion of the packaging may at least partially dissolve when introduced into water or other aqueous liquid to be filtered. In some cases, the filter medium may comprise mineral materials such as diatomaceous earth or perlite.

Figure 6:
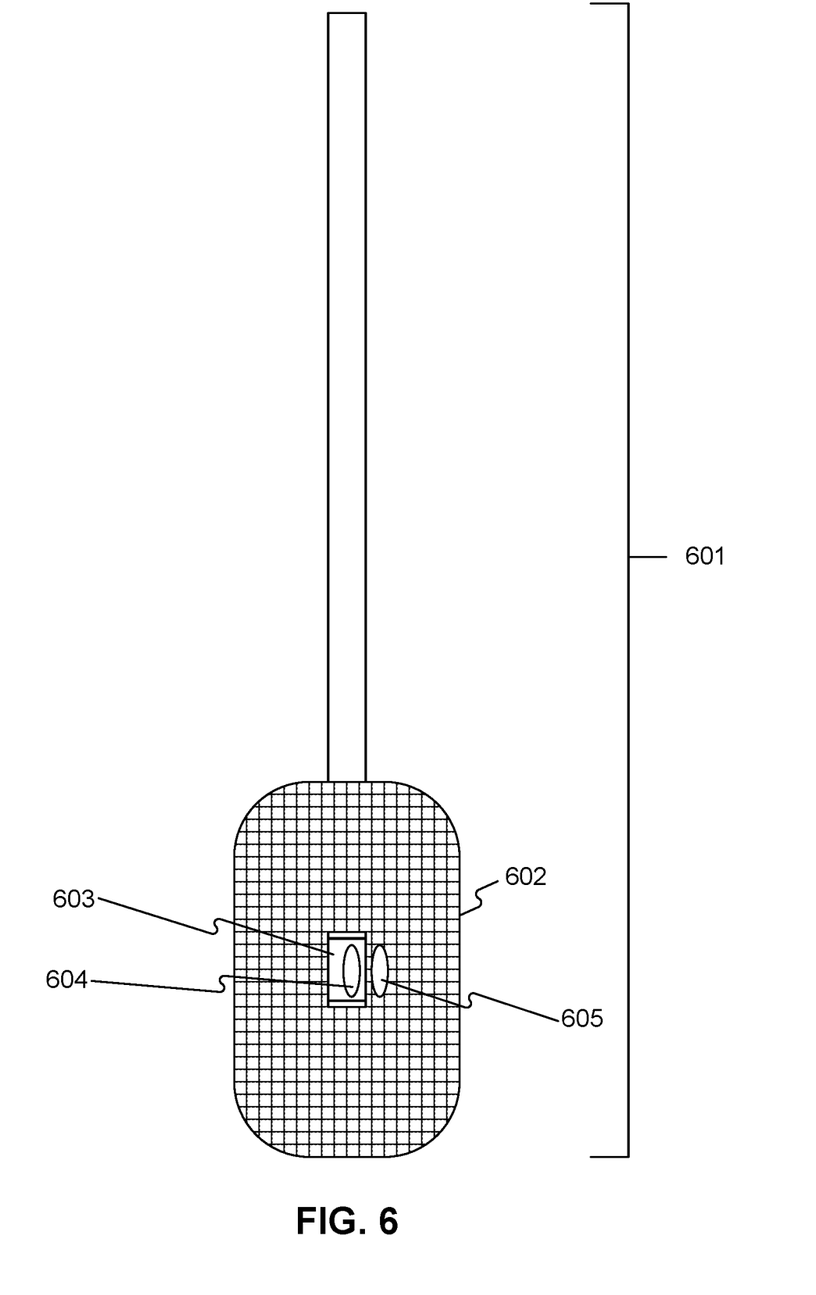
FIG. 6 shows an exemplary filter aid disposed within a filter in use in accordance with some aspects of the present disclosure.

Provided herein also include methods of using the filter aids for filtering a liquid, such as water from a pool. The filter aids may be placed directly into a filtration device or system without the need of taking the filter medium out of the packaging. For example, the methods may include placing the filter aids into or in communication with the filtration device or system (e.g., an inlet 602 of a filtration device 601 or system such as a skimmer 601 of a pool). When the water (or other liquid) contacts the filter aid, a part or the entirety of the packaging may be dissolved and the filter medium may be released to the water. Aspects of the present disclosure may reduce generation and/or exposure to hazardous pollution (e.g., dust) or waste that otherwise may be generated during handling of mineral materials. For example, aspects of the present disclosure may reduce or eliminate the need of transferring the filter medium from one container to another (thus exposing the filter medium to open atmosphere, which may generate dust or water) for use in filtration.

The filter aids herein may comprise a filter medium comprising one or more materials useful for filtering a liquid. Exemplary materials that may be used in filter media include, but are not limited to, diatomaceous earth, perlite (e.g., expanded perlite, milled expanded perlite, etc.), silica gel, cellulose and derivatives thereof (e.g., cellulose fiber, microcrystalline cellulose, cellulose esters, cellulose ethers, etc.), activated carbon, montmorillonite, attapulgite, bentonite, kaolin, ball clay, talc, calcium carbonate, pyrophyllite, silica (including, e.g., fumed silica, precipitated silica, dialytic silica, crystalline silica, quartz, etc.), sodium silicate, silica hydrogel, alumina, zeolites, starches, and combinations thereof. In at least one example, the filter medium comprises sand. For example, the filter medium may comprise crystalline silica, quartz, calcium carbonate, or a combination thereof. The filter medium may be in particulate form, such as granulated particles and/or compacted particles. In at least one example, the filter medium comprises perlite, diatomaceous earth, or a combination thereof. For example, the filter aid may comprise two or more mineral materials, e.g. perlite and diatomaceous earth, enclosed in packaging.

The filter medium may be in the form of fine particles, such as powder. In some examples, the filter medium may comprise larger particles, e.g., fine particles agglomerated into larger particles. The fine particles may be agglomerated with or without a binder (e.g., a water-soluble binder material). In at least one example, the agglomerated particles may be enclosed in a packaging that is water-soluble and at least partially permeable, with pores smaller than the size of the agglomerated particles. When submerged in water, the packaging may dissolve or degrade to allow the agglomerated particles to be released from the packaging.

In some examples, the filter medium may comprise diatomaceous earth having a low cristobalite content. Cristobalite content may be measured by any appropriate measurement technique. In one exemplary method, cristobalite content is measured by X-ray diffraction. For example, by the quantitative X-ray diffraction method outlined in H. P. Klug and L. E. Alexander, X-Ray Diffraction Procedures for Polycrystalline and Amorphous Materials 531-563 (2nd ed. 1972), which is incorporated by reference herein in its entirety, may be used to measure cristobalite content. According to one example of that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of cristobalite, yielding the greatest diffracted intensity. That region ranges from 21 to 23 2θ (2-theta), with data collected in 0.05 2θ steps, counted for 20 seconds per step. The net integrated peak intensity is compared with those of standards of cristobalite prepared by the standard additions method in amorphous silica to determine the weight percent of the cristobalite phase in a sample.

According to some aspects of the present disclosure, the cristobalite content of the diatomaceous earth is less than about 1% by weight, less than about 0.5% by weight, or less than about 0.1% by weight. For example, the cristobalite content may range from about 0.001% to about 0.9% by weight, from about 0.05% to about 0.8% by weight, from about 0.1% to about 0.5% by weight, or from about 0.05% to about 0.3% by weight. In some examples, the cristobalite content of the diatomaceous earth may be below the detection level of the X-ray diffraction system used for measurement.

The amount of the filter medium in the filter aid may range from about 0.1 kg to about 50 kg, e.g., from about 0.1 kg to about 0.3 kg, from about 0.1 kg to about 0.5 kg, from about 0.1 kg to about 1 kg, from about 0.4 kg to about 0.5 kg, from about 1 kg to about 5 kg, from about 2 kg to about 3 kg, from 5 kg to about 10 kg, from about 5 kg to about 6 kg, from about 8 kg to about 10 kg, from 15 to 25 kg, from about 20 kg to about 24 kg, from about 25 kg to about 50 kg, or from about 30 kg to about 45 kg. In certain cases, the amount of filter medium in the filter aid may be at least 0.1 kg, at least 0.5 kg, at least 1 kg, at least 5 kg, at least 10 kg, at least 20 kg, or at least 50 kg.

The filter aids herein comprise a packaging 603 at least partially or completely enclosing the filter medium 604, 605. The packaging may comprise at least one water-soluble portion (e.g., a water-soluble film, screen, or panel). For example, the entire packaging may be formed from one or more water-soluble materials, or the packaging may comprise one or more portions that are water-soluble and one or more portions that are water-insoluble. The packaging may comprise one water-soluble portion, or a plurality of water-soluble portions. In at least one example, the packaging comprises one water-soluble portion, wherein the remainder of the packaging is water-insoluble. In at least one example, the packaging comprises 2, 3, 4, 5, or more water-soluble portions, which may be adjacent to each other or separated by one or more water-insoluble portions. Multiple water-soluble portions of the packaging may have the same or different chemical compositions. For example, the packaging may comprise a first water-soluble portion and a second water-soluble portion, where in the first water-soluble portion is more soluble (e.g., degrades or dissolves more quickly) than the second water-soluble portion under the same conditions.

The water-soluble portion(s) may comprise one or more water-soluble materials, which may be natural or synthetic. The water-soluble portion(s) therefore may be dissolvable (e.g., degradable) in water and/or an aqueous solution. In some examples, the water-soluble material(s) may comprise at least one water-soluble polymer. Exemplary water-soluble materials include, but are not limited to, polyvinyl alcohol, water-soluble nonwoven fabric, partially hydrolyzed polyvinyl acetate, polyvinyl pyrrolidone, alkyl celluloses and derivatives thereof (e.g., methylcellulose, ethylcellulose, propylcellulose, ethers and esters of alkyl celluloses, carboxymethyl cellulose, hydroxyethyl cellulose, etc.), cellulose acetate, acrylic polymers (e.g., water-soluble polyacrylates, polyacrylamides, acrylic maleic anhydride copolymers, etc.), copolymers of hydrolyzed vinyl alcohol and a nonhydrolyzable anionic comonomer, polyethylene oxide, gelatin, dextrin, starch, agar, pectin, guar gum, xanthan gum, carrageenan, alginate, pullulan, copolymers thereof, and combinations thereof.

The one or more water-soluble materials may have characteristics that provide desired solubility properties. For example, desired solubility properties may be achieved by adjusting parameters of the packaging material(s), such as molecular weight, glass transition temperature, presence (or absence) of co-polymers, degree of polymerization, degree of hydrolysis, chain chemistry features of the molecules, stereochemistry features of the molecules, and any combination thereof, among other physical and chemical properties.

According to some aspects of the present disclosure, the packaging may comprise one or more water-soluble polymer(s) having an average molecular weight that provides desired solubility properties. For example, water-soluble polymers with a relatively low molecular weight may have better solubility and shorter dissolution time in water, whereas water-soluble polymers with a relatively high molecular weight may be more resistant to dissolution, e.g., degrading more slowly in water over time. In some examples herein, the packing comprises at least one water-soluble polymer having an average molecular weight ranging from about 1000 Da to about 1,000,000 Da, e.g., from about 10,000 Da to about 300,000 Da, from about 15,000 Da to about 200,000 Da, or from about 20,000 Da to about 150,000 Da.

In some cases, the packaging comprises polyvinyl alcohol, e.g., at least one water-soluble portion that comprises polyvinyl alcohol. Polyvinyl alcohol $((CH_2CH(OH))_n)$ refers to a synthetic polymer generally prepared by hydrolysis or saponification of polyvinyl acetate.

Fully hydrolyzed polyvinyl alcohol, wherein virtually all (>99%) of the acetate groups have been converted to alcohol groups, may be a strongly hydrogen-bonded, highly crystalline polymer. Partially hydrolyzed polyvinyl alcohol refers to the polymer formed wherein less than all of the acetate groups are hydrolyzed, giving rise to different characteristics than fully hydrolyzed polyvinyl alcohol. For example, fully hydrolyzed polyvinyl alcohol polymer may dissolve in water at a higher temperature (e.g., ≥60° C.) compared to partially hydrolyzed polyvinyl alcohol (e.g., <60° C.). In some examples, the degree of hydrolysis of polyvinyl alcohol may be adjusted so that the packaging (e.g., portion(s) of the packaging) has a desired solubility in a desired temperature range.

The water-soluble portion(s) may have a thickness that provides suitable strength for holding the filter medium inside without tearing or otherwise compromising the integrity of the packaging before introduction into liquid. In some cases, for example, the water-soluble film may have a thickness ranging from about 1 μm to about 5 mm, e.g., from about 20 μm to about 150 μm, from about 25 μm to about 130 μm, from about 10 μm to about 50 μm, from about 20 μm to about 30 μm, from about 100 μm to about 500 μm, from about 100 μm to about 300 μm, from about 250 μm to about 750 μm, from about 500 μm to about 2 mm, from about 1 mm to about 5 mm, or from about 1 mm to about 3 mm. In some cases, the water-soluble portion(s) may have a thickness of at least 1 μm, at least 10 μm, at least 20 μm, at least 40 μm, at least 60 μm, at least 80 μm, at least 100 μm, at least 120 μm, at least 150 μm, at least 250 μm, at least 500 μm, at least 1 mm, or at least 3 mm.

The water-soluble portion(s) may be in the form of a continuous film. Alternatively or additionally, the water-soluble portion(s) may be at least partially porous or permeable, e.g., in the form of a screen or mesh. For example, the water-soluble portion(s) may comprise water-soluble nonwoven fabric with pores. According to some aspects of the present disclosure, the size of the pores may be selected based at least in part on the particle size of the filter medium, e.g., such that the packaging encloses and maintains the filter medium until the water-soluble nonwoven fabric dissolves or degrades to allow for release of the filter medium from the packaging into water. In some cases, the nonwoven fabric may comprise a coating or be coupled to a water-soluble film, e.g., to provide additional support to the packaging for maintaining the filter medium before use. Such coatings or films may comprise water-soluble material(s), e.g., PVA. For example, a water-soluble film may be coupled to a water-soluble screen or mesh.

The water-soluble portion(s) of the packaging may further comprise one or more additive ingredients. Exemplary additive ingredients include, but are not limited to, plasticizers, surfactants, emulsifiers, fillers, extenders, anti-blocking agents, detackifying agents, antifoams, film formers, and other functional ingredients.

For example, the water-soluble portion(s) may comprise at least one plasticizer for promoting plasticity and flexibility and/or to reduce brittleness of the material(s). The amount of plasticizer(s) may provide for sufficient flexibility and tensile strength for holding the filter medium inside the packaging. Exemplary plasticizers include sorbitol, glycerol, diglycerol, propylene glycol, ethylene glycol, diethyleneglycol, triethylene glycol, tetraethyleneglycol, polyethylene glycols, 2 methyl 1, 3 propane diol, lactic acid, monoacetin, triacetin, triethyl citrate, 1,3-butanediol, trimethylolpropane, polyether triol, polyols, and combinations thereof. Additionally or alternatively, the water-soluble portion(s) may comprise at least one surfactant and/or at least one defoamer. The surfactant may aid in preparation of the water-soluble portion(s). For example, a suitable amount of surfactant may inhibit or prevent formation of holes. Exemplary surfactants include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof, and combinations thereof. The defoamer(s) may aid in coalescing of foam bubbles. Exemplary defoamers include, but are not limited to, hydrophobic silica (e.g., silicon dioxide, fumed silica, etc.).

As mentioned above, when the packaging is not entirely formed of water-soluble material(s), the packaging may further comprise at least one water-insoluble portion. That is, the water-insoluble portion(s) may be entirely insoluble, or may be poorly soluble in water such that the water-insoluble portion(s) do not degrade or dissolve during use to such a degree as to release the filter medium. The material(s) of the water-insoluble portion(s) may be natural or synthetic. Exemplary materials suitable for the water-insoluble portion(s) include, but are not limited to, insoluble polymers such as polyamide, polyethylene, polypropylene, polystyrene, polyvinyl chloride, polyesters, polyacrylonitrile, polyethylene terephthalate, co-polymers thereof, and combinations thereof, as well as other insoluble (or poorly soluble) materials such as fabric (e.g., cotton, linen, paper (e.g., kraft paper), etc.).

Figure 5A:
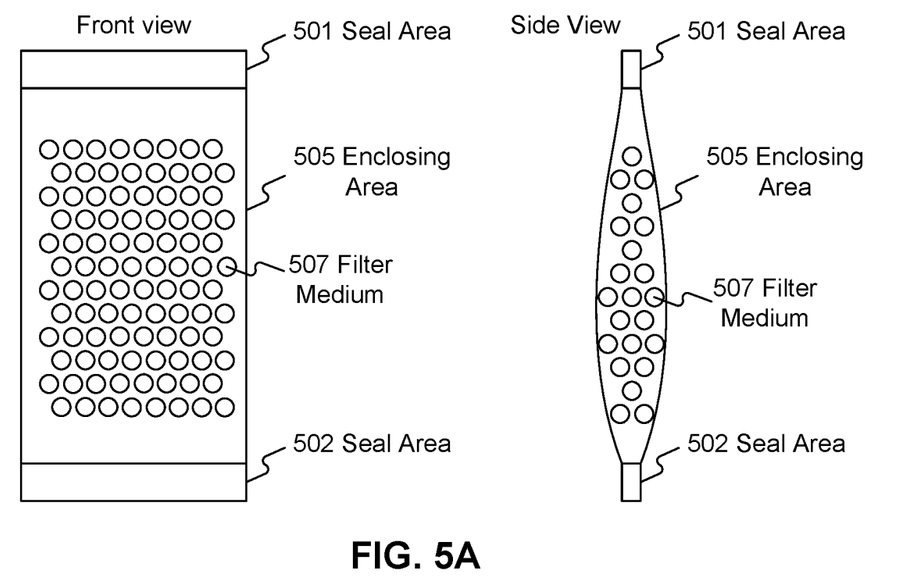
FIG. 5A shows an exemplary filter aid (including a front view (left) and side view (right))

Similar to the water-soluble portion(s), the water-insoluble portion(s) may have a thickness that provides suitable strength for holding the filter medium 507, 508 inside without tearing or otherwise compromising the integrity of the packaging. For example, the water-insoluble portion(s) may have a thickness of at least 1 µm, at least 10 µm, at least 50 µm, at least 100 µm, at least 200 µm, at least 500 µm, at least 1 mm, at least 5 mm, or at least 1 cm. According to some aspects of the present disclosure, the water-insoluble portion(s) may have the same thickness as one or more of the water-soluble portions. For example, the packaging may have a uniform thickness. In some examples, the water insoluble portion(s) may have a thickness that is greater than the thickness of the water-soluble portion(s).

Figure 5B:
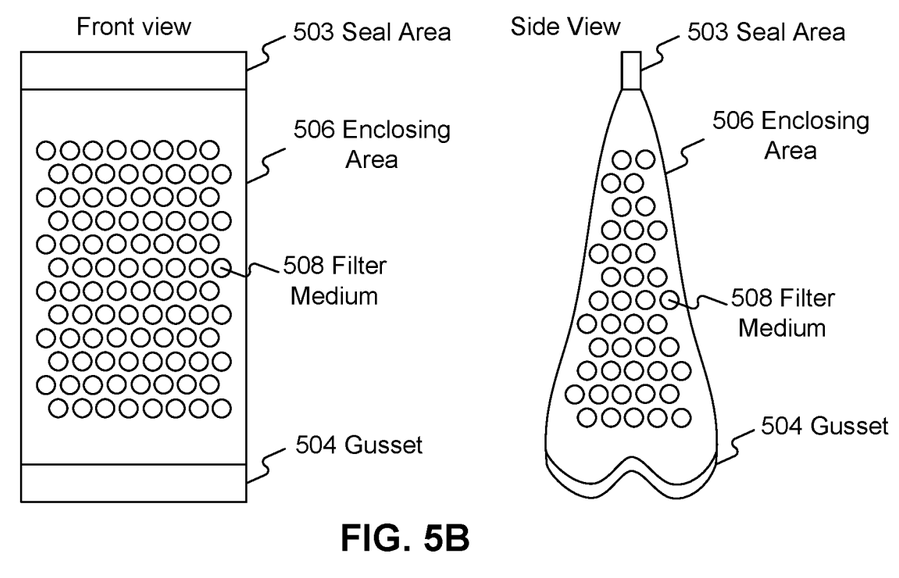
FIG. 5B shows an exemplary container (including a front view (left) and side view (right)) for filter aids in accordance with some aspects of the present disclosure.

When the packaging comprises at least one water-soluble portion (any of 501, 502, 503, 504, 505, 506) and at least one water-insoluble portion (any of 501, 502, 503, 504, 505, 506), in some examples, the water-soluble portion(s) may form seams of the packaging. For example, the packaging may comprise multiple water-insoluble portions connected by water-soluble films, such as in the form of stripe tape or perforations). When the filter aid is placed in a liquid, the water-soluble portions may dissolve so that the packaging opens to release the filter medium into the liquid to be filtered. In at least one example, the filter aid may be made by rolling a packaging film with appropriate width and sealing the edge with one or more water-soluble materials. In some examples, a vertical form fill & seal machine then may be used to fill the resulting cylinder packaging film with a filter medium (or filter media) and to seal the top and bottom edges of the packaging.

The packaging may be suitable for storing and handling within certain environmental conditions, such as ranges of temperature and humidity. For example, the packaging may remain intact under outdoor conditions in summer months when the temperature and humidity tend to be highest. In some cases, the packaging (including, e.g., the water-soluble portion(s)), may remain intact at a temperature of at least 20° C., at least 25° C., at least 30° C., at least 35° C., at least 40° C., at least 45° C., or at least 50° C.

The filter aids herein may have a size suitable for filtration applications. For example, the filter aid may have a size that fits in a filtration device 601 of a pool, such as a pool skimmer 601. According to some aspects of the present disclosure, the filter aid may have a cross sectional area ranging from about 20 cm$^2$ to about 500 cm$^2$, e.g., from about 25 cm$^2$ to about 400 cm$^2$, from about 25 cm$^2$ to about 350 cm$^2$, from about 50 cm$^2$ to about 300 cm$^2$, or from about 100 cm$^2$ to about 250 cm$^2$.

Figure 1:
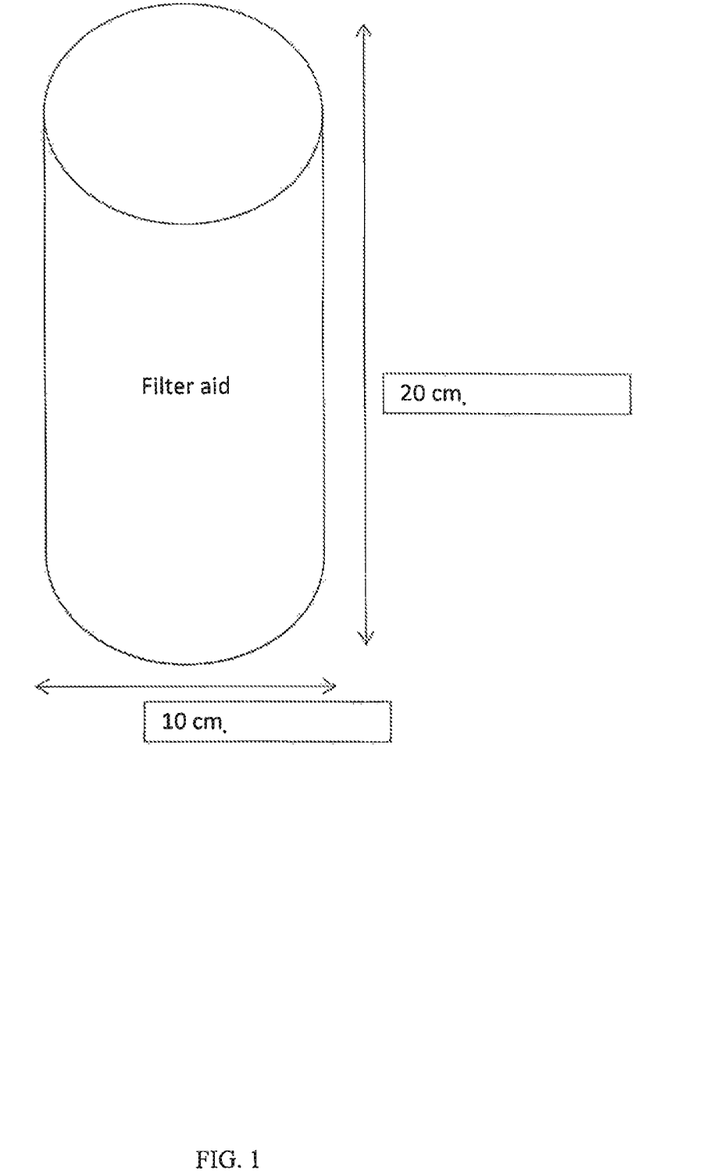
FIG. 1 shows an exemplary filter aid in accordance with some aspects of the present disclosure.

The filter aids herein may have a shape that fits in a filtration device. For example, the filter aid may have a circular, quadrilateral (e.g., square, rectangular, or trapezoidal) cross section, such that the three-dimensional shape of the filter aid is spherical, hemi-spherical, oval, cylindrical, cubic, rectangular, or trapezoidal, among other possible shapes. In some cases, the filter aid may have a shape that fits in a pool skimmer. In at least one example, the filter aid (e.g., the packaging of the filter aid) may have a cylindrical shape, e.g., a cylinder with a height of about 20 cm and a diameter of about 10 cm, as shown in FIG. 1. The shape and dimensions of the packaging and of the filter aid may be chosen based on the desired application, e.g., the dimensions of a pool skimmer or other container used to maintain the filter aid during filtration.

Figure 2A:
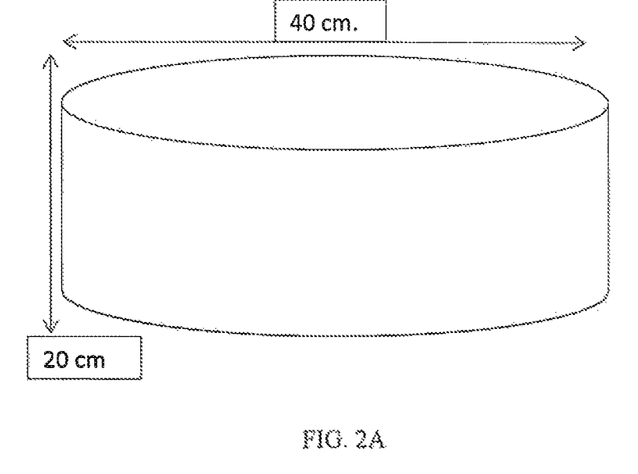
FIGS. 2A and 2B show an exemplary container for filter aids in accordance with some aspects of the present disclosure.
Figure 2B:
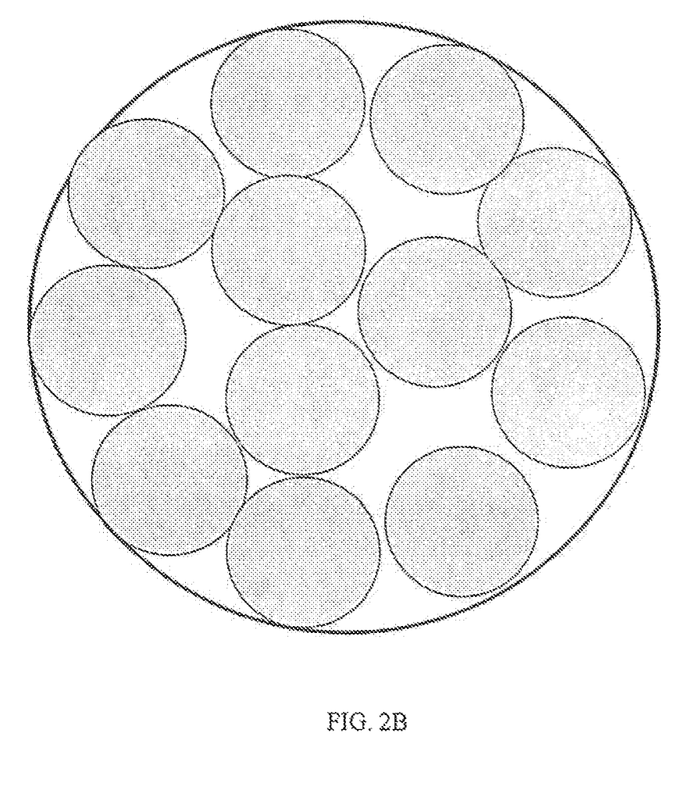
Figure 3A:
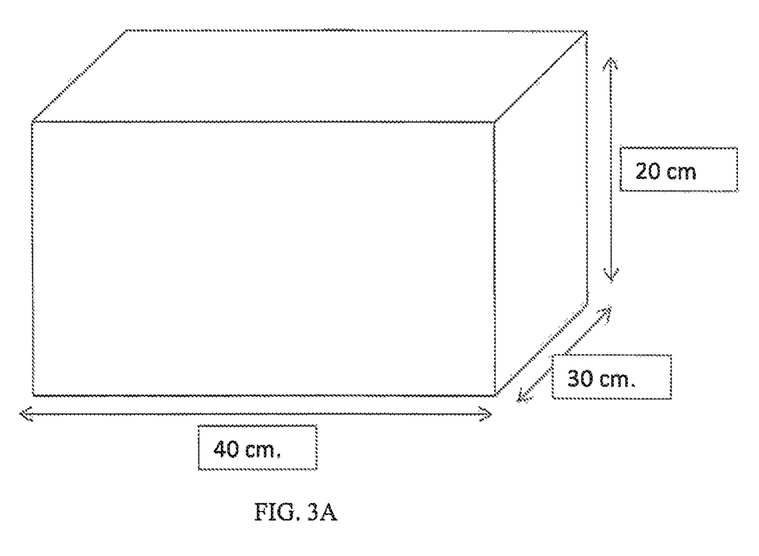
FIGS. 3A and 3B show another exemplary container for filter aids in accordance with some aspects of the present disclosure.
Figure 3B:
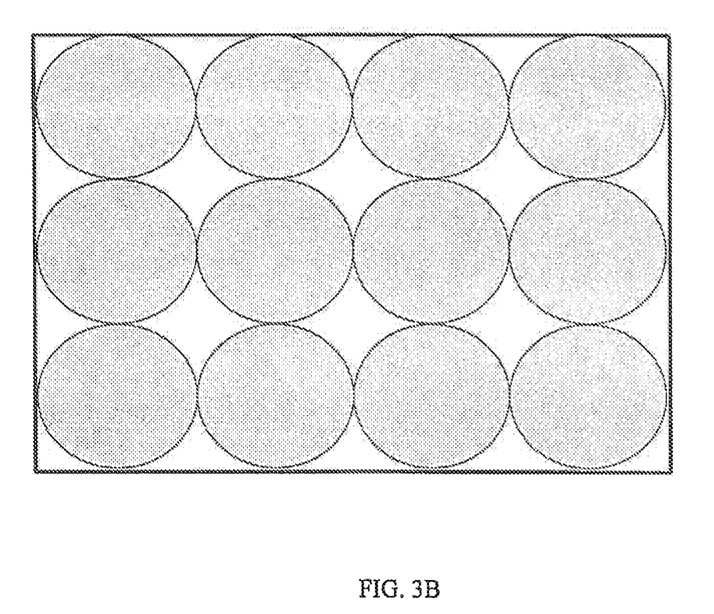
Figure 4A:
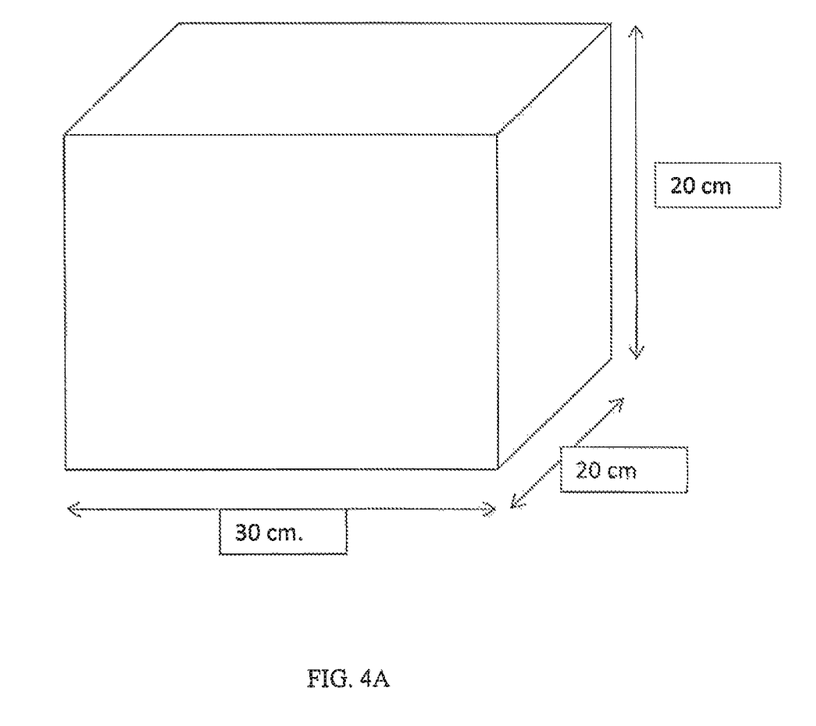
FIGS. 4A and 4B show another exemplary container for filter aids in accordance with some aspects of the present disclosure.
Figure 4B:
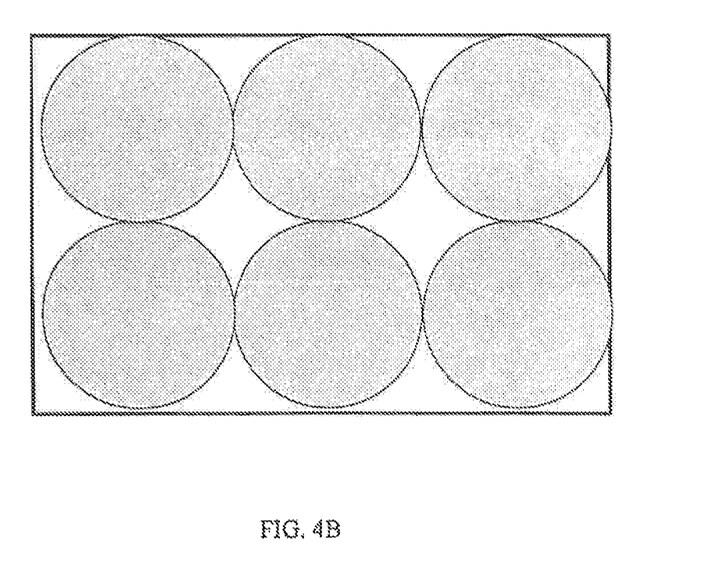

In some examples, multiple filter aids may be assembled or coupled together, e.g., for transportation and/or storage purposes. For example, a container may be used to accommodate multiple filter aids. For example, the container may be a cylindrical or rectangular box, among other possible shapes. The container may hold at least 2, at least 3, at least 4, at least 5, at least 6, at least 7, at least 8, at least 9, at least 10, at least 12, at least 15, or at least 20 filter aids. Exemplary containers holding multiple cylindrical filter aids are shown in FIGS. 2-4. FIG. 2A shows a perspective view of a cylindrical container and FIG. 2B shows a cross-sectional view of the cylindrical container housing 12 cylindrical filter aids. FIG. 3A shows a rectangular container and FIG. 3B shows a cross-sectional view of the rectangular container housing 12 cylindrical filter aids. FIG. 4A shows a cubic container and FIG. 4B shows a cross-sectional view of the cubic container housing 6 cylindrical filter aids.

Another exemplary filter aid is shown in FIG. 5A, including a front view (left) and side view (right). The filter aid comprises a water-soluble packaging sealed at the two seal areas 501, 502 at the top and bottom portions of the packaging, forming a pouch for containing a filter medium or filter media. FIG. 5B shows an exemplary container, e.g., a secondary packaging, which may or may not comprise water-soluble portion(s). The container of FIG. 5B may house one or more filter aids as disclosed herein, including the examples illustrated in FIGS. 1 and 5A. For example, the container of FIG. 5B may hold 1 to 30 or more filter aids as shown in FIG. 5A, such as 5-25 filter aids, or 15-30 filter aids, e.g., 2, 3, 4, 5, 6, 8, 10, 15, 20, 25, or 30 filter aids. The container may be sealed at an seal area 503 at one end, such as at the top portion as shown. The seal area 503 may be resealable, e.g., allowing for the introduction and removal of filter aids therein. In at least one example, the container of FIG. 5B comprises a resealable plastic bag. In some examples, the container may be sealed at both ends, and optionally resealable at one or both ends. According to some aspects of the present disclosure, the container may comprise a gusset 504 at the end opposite the seal area 503, e.g., at the bottom portion of the container as shown in FIG. 5B. In other examples, the container may not include a gusset 504.

These configurations are exemplary only. Other shapes and configurations of containers and filter aids are contemplated herein.

The filter aid may further comprise other components suitable for certain filtration application. For example, when the filter aid is used to filter recreational water, it may comprise one or more chemicals or agents for sanitizing the water. The additional components may be mixed with the filter medium. Alternatively, the additional components may be packed in one or more compartments separated from the filter medium.

The filter aids may be made using equipment and methods for making pouches and packets. In some cases, single compartment pouches may be made using vertical form filling, horizontal form filling, or rotary drum filling techniques. Such processes may be either continuous or intermittent. The packaging may be dampened, and/or heated to increase the malleability thereof. The method may also involve the use of a vacuum to draw the packaging into a suitable mold.

The packaging or its one or more portions may be sealable. Exemplary means for sealing the packaging or its one or more portions include heat sealing, solvent welding, solvent or wet sealing, and combinations thereof. Exemplary wet or solvent sealing/welding methods include selectively applying solvent onto the area between the molds, or on the closing material, by, for example, spraying or printing this onto these areas, and then applying pressure onto these areas, to form the seal. The entirety of the filter aid and/or the individual compartments thereof may be heat sealed at a temperature of from about 150° C. to about 250° C., e.g., from about 180° C. to about 240° C., or from about 200° C. to about 230° C. For example, the filter aid or individual compartments thereof may be thermoplastic in order to be capable of being formed into packets by heat sealing two layers of the materials. Alternatively or additionally, the filter aid or individual compartments may be coated in part or entirely with a compatible thermoplastic material to make possible formation of packets by heat-sealing. In some cases, only the area that is to form the seal may be treated with heat and/or solvent(s) (e.g., water or other suitable solvent(s)). The heat or solvent may be applied by any method, e.g., on the closing material, and only on the areas which are to form the seal. If solvent or wet sealing or welding is used, heat may also be applied.

Further disclosed herein are methods of filtering a liquid using the filter aid described herein. The methods may comprise introducing the filter aid to the liquid, e.g., introducing the filter aid to a flow of water in communication with a body of water. The entirety or a part of the packaging of the filter aid may dissolve in the liquid to release the filter medium. When the packaging comprises water-insoluble material(s), the water-insoluble material(s) may optionally be removed from the flow of water (or other liquid) after a period of time, e.g., to prevent clogging. In some cases, the packaging may be configured to prevent or otherwise reduce the risk of clogging. For example, the packaging may be entirely water-soluble, or the water-soluble portion(s) may form smaller fragments or pieces when the water-soluble portion(s) have dissolved.

The methods may be used to filter various types of liquid, e.g., water, water-based liquids, and aqueous solutions. In some cases, the liquid may be or comprise water from a natural water source, e.g., a natural spring, hot spring, pond, river, stream, lake, or sea. In some examples, the water may be contained in a manmade or other artificial structure, such as a swimming pool, spa, hot tub, fountain, or artificial body of water (e.g., an artificial spring, hot spring, pond, river, stream, lake, waterfall, etc.). The liquid (e.g., water) may be used for recreational and/or therapeutic purposes (e.g., a swimming pool, spa, hot tub, artificial or natural spring or hot spring, etc.). In some examples, the liquid may comprise one or more chemicals. Such chemicals include chemicals for adjusting pH and/or for treating the water, e.g., for sanitizing water and/or maintaining appropriate levels of various components such as salts, microorganisms (e.g., in some cases eliminating certain or all microorganisms), etc. Exemplary chemicals include, but are not limited to, chlorine, bromine, biguanide, cyanuric acid, algaecide, water clarifiers, stain or scale removers, and combinations thereof. In some cases, the water may be suitable for recreational use, e.g., in a pool, comprising chlorine ranging from about 1.0 parts per million (ppm) to about 3.0 ppm, such as from about 1.5 ppm to about 2.5 ppm. Additionally or alternatively, the water may have a pH ranging from about 6.0 to about 8.0, e.g., from about 7.3 to about 7.7. The total amount of alkaline substances in the water may be from about 50 ppm to about 150 ppm, e.g., from about 90 to about 120 ppm. The water (or other liquid) to be filtered may comprise one or more salts, e.g., calcium ions from calcium salts. In some examples, the water may comprise calcium, wherein the calcium level (e.g., measure of hardness) may be from about 100 ppm to about 500 ppm, e.g., from about 200 ppm to about 400 ppm. The water-soluble portion of the packaging may be capable of dissolving in such liquids. In some examples, the liquid may be water, a water-based liquid, or an aqueous solution used for residential and/or industrial purposes. For example, the filter aids herein may be used for filtration of a residential or industrial water supply. In some examples, the liquid that can be filtered using the filter aid may be a beverage, including, e.g., drinking water, tea, juices, or alcoholic beverage (e.g., distilled spirit, beer, or wine).

When the filter aid is introduced into the liquid, the water-soluble portion(s) of the packaging may dissolve within certain amount of time to release the filter medium. The dissolution time may be depend on various factors, such as the chemical composition, pH, flow rate, and/or temperature of the water; and/or the chemical composition, thickness, arrangement, and/or size of the water-soluble portion(s). For example, the water-soluble portion of the packaging may dissolve within 30 minutes, within 20 minutes, within 10 minutes, within 5 minutes, within 3 minutes, within 1 minutes, within 30 seconds, or within 10 seconds when introduced into the liquid.

In some cases, the packaging may comprise two or more water-soluble portions with different dissolving times. Such packaging may allow different portions of the filter medium to be in contact with the liquid at a desired time. For example, the packaging may comprise a first water-soluble portion and a second water-soluble portion, where the first water-soluble portion dissolves faster, e.g., at least 10 seconds, at least 30 seconds, at least 1 minute, at least 5 minutes, at least 10 minutes, at least 20 minutes, or at least 30 minutes faster, than the second water-soluble portion.

The filter aid may have multiple compartments. In some cases, the filter aid may have at least 2, at least 3, at least 4, at least 5, or at least 6 compartments, one or more of which have at least one water-soluble portion. When the filter aid is introduced into the liquid, the compartments may dissolve in the liquid at different time so that different amounts and/or portions of the filter medium are released into the liquid at a specific time. For example, the packaging of the filter aid may comprise a first compartment and a second compartment, wherein both the first and second compartments comprise at least one water-soluble portion. The water-soluble portion(s) of the first compartment may dissolve in the liquid slower than the water-soluble portion(s) of the second compartment. In some cases, the filter aid may comprise a first filter medium in the first compartment and a second filter medium (the same or different from the first filter medium) in the second compartment. In these cases, the first filter medium may be released into the liquid slower than the second filter medium. In certain cases, the filter aid may comprise a filter medium in a first compartment and a material different from the filter medium in a second compartment. The filter medium in the first compartment may be released at a time different (e.g., slower) than the material in the second compartment. When released, the material may have a beneficial impact on the filtration device, e.g., supporting the filtration device and/or assisting in the filtration process. Exemplary materials useful for the second compartment include, but are not limited to, cellulose and cellulose derivatives.

For example, in some embodiments, a filter aid comprising two or more components can be provided, wherein a first component is provided in a non-soluble package and a second component can be provided in a package including at least one soluble portion. For example, the first component can comprise a perlite filter aid material, and the second component can comprise a diatomaceous earth filter aid material. In some embodiments, the first component can comprise a substantially larger amount of filter aid than the second component. For example, the first component can make up at least 50%, at least 60%, at least 70% or at least 80% of the total filter aid to be provided, and the second component can make up not more than 50%, not more than 40%, not more than 30% or not more than 20% of the total filter aid to be provided.

For example, the filter aid may comprise a first filter medium, such as perlite and/or diatomaceous earth, in the first compartment and a second filter medium comprising cellulose or a cellulose derivative. When released from the packaging to a filter screen of a filtration device, for example, the cellulose may form a layer covering damaged parts of the filter screen. In one example, the filter medium may be enclosed in a first compartment with a thickness of at least 50 µm and the cellulose may be enclosed in a second compartment with a thickness of less than 40 µm. When introduced in a liquid, the cellulose may be released from the second compartment within about 30 seconds and the filter aid may be released from the first compartment after about 60 seconds.

Use of the filter aid may comprise passing liquid to be filtered through the filter medium, e.g., after at least some of the water-soluble portion(s) of the packaging has dissolved or degraded to release the filter medium or otherwise enable the liquid to penetrate the filter medium. The liquid may be passed through the filter medium at a flow rate suitable for the filtration application. For example, flow rate may range from about 0.1 gallons per minute per square foot (gpm/ft$^2$) to about 30 gpm/ft$^2$, e.g., from about 0.5 gpm/ft$^2$ to about 1.5 gpm/ft$^2$, from about 1 gpm/ft$^2$ to about 2 gpm/sqft, from about 1.5 gpm/ft$^2$ to about 2.5 gpm/ft$^2$, from about 10 gpm/ft$^2$ to about 25 gpm/ft$^2$, or from about 15 gpm/ft$^2$ to about 25 gpm/ft$^2$, e.g., a flow rate of about 1 gpm/ft$^2$, about 2 gpm/ft$^2$, about 5 gpm/ft$^2$, about 10 gpm/ft$^2$, about 15 gpm/ft$^2$, about 20 gpm/ft$^2$, or about 25 gpm/ft$^2$.

In some cases, introducing the filter aid into the liquid may comprise submerging the filter aid at least partially or fully in the liquid. The water-soluble portion(s) of the packaging exposed to the liquid then may dissolve to release part or all of the filter medium into the liquid.

According to some aspects of the present disclosure, a method for delivering a mechanical insecticide is provided. The method may for example include introducing a mechanical insecticide into water for form a slurry or suspension, wherein the mechanical insecticide comprises a powdered or granular mechanical insecticide and is packaged in packaging comprising at least one water-soluble portion. In one embodiment, the mechanical insecticide can comprise perlite. In another embodiment, the mechanical insecticide comprises diatomaceous earth. In yet another embodiment, the mechanical insecticide comprises diatomaceous earth carrying one or more of a surfactant, a chemical insecticide.

According to yet another aspect, the mechanical insecticide may include mineral composition including at least one of a perlite and a diatomaceous earth particulate. In one embodiment, the mechanical insecticide composition is not a carrier for a chemical toxin.

The mechanical insecticide may be effective to kill an arthropod including, for example, at least one of Insecta and Arachnida. For example, the Insecta may include one of Coleoptera, Diptera, Lepidopterea, Hemiptera, and Thysanoptera. For example, the Insecta may include one of a beetle, a potato beetle, a flea beetle, a larvae of a fly, a larvae of whitefly, a larvae of mosquito, a mosquito (e.g., *Anopheles gambiae*), a caterpillar of moths, a caterpillar of earworm, a corn earworm, a caterpillar of armyworm, a caterpillar of looper, a caterpillar of leafminer, a lygus bug, an aphid, a psyllid, a scale insect, a mealybug, a head louse, and a thrip. According to some embodiments, the Arachnida may include *Acari*. For example, the *Acari* may include one of a spider mite, a rust mite, and a gall mite. Other arthropods are contemplated.

Perlite is a hydrated natural glass that may contain, for example, about 72% to about 75% $SiO_2$ by weight, about 12% to about 14% $Al_2O_3$ by weight, about 0.5% to about 2% $Fe_2O_3$ by weight, about 3% to about 5% $Na_2O$ by weight, about 4 to about 5% $K_2O$ by weight, about 0.4% to about 1.5% CaO by weight, and small amounts of other metallic elements. Perlite may be distinguished from other natural glasses by a relatively higher content (such as about 2% to about 5% by weight) of chemically-bonded water, the presence of a vitreous, pearly luster, and characteristic concentric or arcuate onion skin-like (i.e., perlitic) fractures. Perlite products may be prepared by milling and thermal expansion, and may possess unique physical properties such as high porosity, low bulk density, and chemical inertness. "Perlite," as used herein, also includes expanded perlite. Perlite typically has a Mohs hardness greater than about 5, such as ranging from about 5.5 to about 7.0.

Particle sizes and other particle size properties referred to in the present disclosure may be measured by any appropriate measurement technique now known to the skilled artisan or hereafter discovered, such as, for example, a Sedigraph 5100 instrument, as supplied by Micromeritics Corporation, or a Microtrac Model X-100, as supplied by Leeds & Norththrup. Using such measuring devices, the size of a given particle is expressed in terms of the diameter of a sphere of equivalent diameter, sometimes referred to as "an equivalent spherical diameter" or "esd." The median particle size, or the "d50" value, is the value determined by the particle esd at which 50% by weight of the particles have an esd less than the d50 value. Similarly, the top size "d90" value is the value determined by the particle esd at which 90% by weight of the particles have an esd less than the top size d90 value, and the top size "d90" value, is the value determined by the particle esd at which 90% by weight of the particles have an esd less than the d90 value. Similarly, the "d10" value, is the value determined by the particle esd at which 10% by weight of the particles have an esd less than the d10 value. Other methods and/or devices for determining particle size and related properties are contemplated.

In one embodiment, the mechanical insecticide may include expanded perlite, such as, for example, milled expanded perlite. In another embodiment, the mechanical insecticide may include a natural perlite ore. expanded perlite, such as, for example, milled expanded perlite.

According to some embodiments of the method, the perlite used may have a median particle size d50 of 10 microns or less. For example, the perlite particulate may have a median particle size d50 of 7.5 microns or less, a median particle size d50 of 5 microns or less, or a median particle size d50 of 2.5 microns or less. According to some embodiments, the perlite particulate may have a top particle size d90 of 45 microns or less. For example, the perlite particulate may have a top particle size d90 of 35 microns or less, a top particle size d90 of 25 microns or less, a top particle size d90 of 15 microns or less, a top particle size d90 of 20 microns or less, or a top particle size d90 of 10 microns or less. According to some embodiments, the perlite particulate may have a particle size d10 of 2.5 microns or less. For example, the perlite particulate may have a particle size d10 of 1.5 microns or less, or a particle size d10 of 1.0 micron or less.

According to some embodiments of the method, the perlite particulate may have a median particle size d50 of 10 microns or less, a top particle size d90 of 45 microns or less, and a particle size d10 of 2.5 microns or less. According to some embodiments, the perlite particulate may have a median particle size d50 of 5 microns or less, a top particle size d90 of 35 microns or less, and a particle size d10 of 1.5 microns or less. According to some embodiments, the perlite particulate may have a median particle size d50 of 3 microns or less, a top particle size d90 of 11 microns or less, and a particle size d10 of 1.2 microns or less.

According to one embodiment, the crystalline silica content of perlite described herein is less than about 5% by weight relative to the total weight of the perlite. In one embodiment, the crystalline silica content is less than about 3% by weight. In another embodiment, the crystalline silica content is less than about 2% by weight. In a further embodiment, the crystalline silica content is less than about 1% by weight. In yet another embodiment, the crystalline silica content is less than about 0.5% by weight. In yet a further embodiment, the crystalline silica content is less than about 0.2% by weight. In still another embodiment, the crystalline silica content is less than about 0.1% by weight.

Crystalline silica content may be measured, for example, by the quantitative X-ray diffraction method outlined in H. P. Klug and L. E. Alexander, X-Ray Diffraction Procedures for Polycrystalline and Amorphous Materials 531-563 (2nd ed. 1972). According to that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of crystalline silica, yielding the greatest diffracted intensity. That region ranges from 21 to 23 $2\theta$ (2-theta), with data collected in 0.05 $2\theta$ steps, counted for 20 seconds per step. The net integrated peak intensity is compared with those of standards of crystalline silica prepared by the standard additions method in amorphous silica to determine the weight percent of the crystalline silica phase in a sample.

According to other embodiments, the mineral composition may include diatomaceous earth particulate. Diatomaceous earth particulate may be obtained from naturally occurring or "natural" diatomaceous earth (also called "DE" or "diatomite"), which is generally known as a sediment-enriched in biogenic silica (i.e., silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures including two valves that, in the living diatom, fit together much like a pill box.

According to one embodiment, the diatomaceous earth can be a natural, i.e., uncalcined diatomaceous earth. In another embodiment, the diatomaceous earth can be a calcined diatomaceous earth, such as for example a flux calcined diatomaceous earth.

Diatomaceous earth may form from the remains of waterborne diatoms, and therefore, diatomaceous earth deposits may be found close to either current or former bodies of water. Those deposits are generally divided into two categories based on source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

According to some embodiments of the method, the diatomaceous earth particulate may have a median particle size d50 of 15 microns or less. For example, the diatomaceous earth particulate may have a median particle size d50 of 12 microns or less, a median particle size d50 of 7.5 microns or less, or a median particle size d50 of 5 microns or less. According to some embodiments, the diatomaceous earth particulate may have a top particle size d90 of 45 microns or less. For example, the diatomaceous earth particulate may have a top particle size d90 of 35 microns or less, a top particle size d90 of 25 microns or less, or a top particle size d90 of 10 microns or less. According to some embodiments, the diatomaceous earth particulate may have a particle size d10 of 5 microns or less. For example, the diatomaceous earth particulate may have a particle size d10 of 2.5 microns or less, or a particle size d10 of 1.5 microns or less.

According to some embodiments of the method, the diatomaceous earth particulate may have a median particle size d50 of 12.5 microns or less, a top particle size d90 of 35 microns or less, and a particle size d10 of 5 microns or less. According to some embodiments, the diatomaceous earth particulate may have a median particle size d50 of 5 microns or less, a top particle size d90 of 10 microns or less, and a particle size d10 of 2.5 microns or less.

According to some additional aspects of the present disclosure, a method for delivering a mineral containing composition is provided. The method may for example include introducing a mineral composition into water for form a slurry or suspension, wherein the mineral comprises a powdered or granular mineral and is packaged in packaging comprising at least one water-soluble portion. In one embodiment, the mineral can comprise perlite. In another embodiment, the mineral comprises diatomaceous earth. In yet another embodiment, the mineral comprises diatomaceous earth carrying one or more of a surfactant, a chemical insecticide. In one aspect, the slurry or suspension of the mineral containing composition can be applied directly to a crop by spraying, as a sun protectant or mechanical insecticide. In another aspect, the slurry or suspension of the mineral containing composition can be applied to soil as a soil conditioner.

In one example, a mechanical insecticide or other mineral containing composition can be packaged in packaging comprising at least one water-soluble portion in an amount ranging from about 20 to about 100 grams. In other examples, mechanical insecticide or other mineral containing composition can be packaged in packaging comprising at least one water-soluble portion in an amount ranging from about 100 to about 1000 grams, such as for example about 100 grams to about 750 grams.

Other aspects and embodiments of the present disclosure will be apparent to those skilled in the art from consideration of the specification and practice of the embodiments disclosed herein.

It is intended that the specification and examples therein be considered as exemplary only, with a true scope and spirit of the present disclosure being indicated by the following claims.

What is claimed is:

1. A method for filtering water, the method comprising:
   introducing a filter aid into a flow of water to filter the water,
   wherein the filter aid comprises a filter medium and packaging enclosing the filter medium;
   wherein the packaging comprises a first water-soluble portion and a second water-soluble portion, and
   wherein the first water-soluble portion dissolves faster than the second water-soluble portion.

2. The method of claim 1, wherein the introducing the filter aid into the flow of water includes introducing the filter aid into an inlet of a filtration device.

3. The method of claim 2, wherein the inlet is a pool skimmer.

4. The method of claim 1, wherein at least 80% of the filter medium is in contact with the water within 1 minute after introducing the filter aid into the flow of water.

5. The method of claim 1, wherein the filter medium comprises diatomaceous earth, perlite, sand, cellulose, bentonite, silica gel, activated carbon, or a mixture thereof.

6. The method of claim 1, wherein an entirety of the packaging has a thickness ranging from about 20 µm to about 150 µm.

7. The method of claim 1, wherein at least one of the first water-soluble portion or the second water-soluble portion dissolves within 1 minute after introducing the filter aid into the flow of water.

8. The method of claim 1, wherein the packaging comprises at least one water-insoluble portion.

9. The method of claim 1, wherein at least one of the first water-soluble portion and the second water-soluble portion of the packaging comprises polyvinyl alcohol.

10. The method of claim 1, wherein the filter aid comprises from about 5 kg to about 25 kg of the filter medium.

11. The method of claim 1, wherein the flow of water is in communication with a swimming pool, a spa, a hot tub, or a fountain.

12. The method of claim 1, wherein the filter aid comprises from about 0.1 kg to about 25 kg of the filter medium.

13. A method for filtering a fluid, the method comprising:
   introducing a filter aid into a flow of water to filter the water,
   wherein the filter aid comprises a first filter medium, a second filter media, and packaging,
   wherein the packaging comprises a first water-soluble portion in contact with the first filter medium and a second water-soluble portion in contact with the second filter medium, and
   wherein the first water-soluble portion dissolves faster than the second water-soluble portion.

14. The method for filtering a fluid of claim 13, wherein the first filter medium comprises perlite.

15. The method of filtering a fluid of claim 14, where the second filter medium comprises diatomaceous earth.

16. The method of claim 1, wherein the packaging comprises a first compartment and a second compartment, the first compartment comprises the first water-soluble portion, and the second compartment comprises the second water-soluble portion.

17. The method of claim 16, wherein the filter medium comprises a first filter medium and a second filter medium, the first compartment encloses the first filter medium, and the second compartment encloses the second filter medium.

18. The method of claim 17, wherein the first filter medium comprises at least one of cellulose or a cellulose derivative.

19. The method of claim 18, wherein the second filter medium comprises at least one of perlite or diatomaceous earth.

20. The method of claim 19, wherein, when introduced into the flow of water, the first filter medium is released from the first compartment within about 30 seconds and the second filter medium is released from the second compartment after about 60 seconds.

\* \* \* \* \*